United States Patent
Hwang et al.

(10) Patent No.: US 7,298,797 B2
(45) Date of Patent: Nov. 20, 2007

(54) TRANSMITTER AND RECEIVER PROVIDED IN WIRELESS COMMUNICATION SYSTEM USING FOUR TRANSMITTING ANTENNAS

(75) Inventors: Chan-Soo Hwang, Yongi-shi (KR);
Seung-Hoon Nam, Seoul (KR);
Yung-Soo Kim, Songnam-shi (KR);
Jae-Hak Chung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 701 days.

(21) Appl. No.: 10/692,894

(22) Filed: Oct. 24, 2003

(65) Prior Publication Data
US 2004/0137951 A1  Jul. 15, 2004

(30) Foreign Application Priority Data
Jan. 9, 2003  (KR)  ............... 10-2003-0001454

(51) Int. Cl.
*H04L 27/20* (2006.01)
(52) U.S. Cl. ........................................ 375/308
(58) Field of Classification Search ........ 375/259, 375/260, 299, 308, 316, 337, 341, 347
See application file for complete search history.

(56) References Cited

U.S. PATENT DOCUMENTS

| | | | | |
|---|---|---|---|---|
| 6,678,263 | B1 * | 1/2004 | Hammons et al. | 370/342 |
| 2002/0044591 | A1 * | 4/2002 | Lee et al. | 375/130 |
| 2002/0101908 | A1 * | 8/2002 | Kim et al. | 375/147 |
| 2003/0021355 | A1 * | 1/2003 | You | 375/267 |
| 2003/0086479 | A1 * | 5/2003 | Naguib | 375/144 |
| 2003/0174782 | A1 * | 9/2003 | Papadias et al. | 375/295 |
| 2004/0120411 | A1 * | 6/2004 | Walton et al. | 375/260 |
| 2004/0137864 | A1 * | 7/2004 | Hwang et al. | 455/130 |

OTHER PUBLICATIONS

Vahid Tarokh et al., "Space-Time Block Codes From Orthogonal Designs", IEEE Transactions on Information Theory, vol. 45, No. 5, Jul. 1999, pp. 1456-1467.
Siavash M. Alamouti, "A Simple Transmit Diversity Technique for Wireless Communications," IEEE Journal on Select Areas in Communications, vol. 16, No. 8, Oct. 1998, pp. 1451-1458.
Weifeng Su et al., Quasi-Orthogonal Space-Time Block Codes with Full Diversity, 2002.
Naresh Sharma et al., Improved Quasi-Orthogonal Codes Through Constellation Rotation, 2002.
Hamid Jafarkhani, "A Quasi-Orthogonal Space-Time Block Code", IEEE Transactions on Communications, vol. 49, No. 1, Jan. 2001, pp. 1-4.

* cited by examiner

*Primary Examiner*—Emmanuel Bayard
(74) *Attorney, Agent, or Firm*—The Farrell Law Firm

(57) ABSTRACT

An apparatus using transmitting antenna diversity to combat degradation due to fading in a wireless communication system. At least two symbols of four symbols to be transmitted through four transmitting antennas are rotated by predetermined phase values. An encoder configures four combinations for four input symbols so that a sequence of four symbols can be transmitted once by each transmitting antenna during each time interval. The combinations are transferred to the four transmitting antennas during four time intervals. Before the four input symbols are transmitted to the transmitting antennas, at least two symbols selected from the four input symbols are rotated by predetermined phase values. Therefore, the maximum diversity order can be obtained, a transmission delay time can be reduced, and the effect of fast fading can be reduced.

22 Claims, 7 Drawing Sheets

TRANSMITTER AND RECEIVER PROVIDED IN WIRELESS COMMUNICATION SYSTEM USING FOUR TRANSMITTING ANTENNAS

PRIORITY

This application claims priority to an application entitled "TRANSMITTER AND RECEIVER PROVIDED IN WIRELESS COMMUNICATION SYSTEM USING FOUR TRANSMITTING ANTENNAS", filed in the Korean Industrial Property Office on Jan. 9, 2003 and assigned Ser. No. 2003-1454, the contents of which are hereby incorporated by reference.

BACKGROUND OF THE INVENTION

1. Field of the Invention

The present invention relates to a wireless communication system, and more particularly to a transmitter and receiver using transmitting antenna diversity to combat degradation due to fading.

2. Description of the Related Art

One of the effective technologies for mitigating the effect of multipath fading in a wireless communication system is time and frequency diversity. A technique based on space-time block codes proposed by Vahid Tarokh et al., among techniques associated with antenna diversity, has been extended from a transmitting antenna diversity scheme proposed by S. M. Alamouti so that two or more antennas can be used. Vahid Tarokh et al. proposed and disclosed "Space-Time Block Codes from Orthogonal Designs", *IEEE Transactions on Information Theory*, vol. 45, pp. 1456-1467, July 1999, and S. M. Alamouti proposed and disclosed "A Simple Transmit Diversity Technique for Wireless Communications", *IEEE Journal on Select Areas in Communications*, vol. 16, pp. 1451-1458, October, 1998.

FIG. 1 is a block diagram illustrating the configuration of a conventional transmitter using the space-time block codes proposed by Vahid Tarokh. As shown in FIG. 1, the conventional transmitter includes an S/P (Serial-to-Parallel) converter 110 and an encoder 120. Here, the transmitter is based on a structure using four transmitting antennas 130, 132, 134 and 136.

Referring to FIG. 1, the S/P converter 110 combines input symbols in units of four symbols and then provides the combined symbols to the encoder 120. The encoder 120 configures eight symbol combinations using the four symbols, and transfers, to the four transmitting antennas 130, 132, 134 and 136, the eight symbol combinations during eight time intervals. The eight symbol combinations can be expressed as an 8×4 code matrix as in the following Equation 1.

$$G_4 = \begin{pmatrix} s_1 & s_2 & s_3 & s_4 \\ -s_2 & s_1 & -s_4 & s_3 \\ -s_3 & s_4 & s_1 & -s_2 \\ -s_4 & -s_3 & s_2 & s_1 \\ s_1^* & s_2^* & s_3^* & s_4^* \\ -s_2^* & s_1^* & -s_4^* & s_3^* \\ -s_3^* & s_4^* & s_1^* & -s_2^* \\ -s_4^* & -s_3^* & s_2^* & s_1^* \end{pmatrix}$$

Equation 1

In the above Equation 1, G4 denotes the code matrix associated with the symbols to be transmitted from the four transmitting antennas, and $s_1$, $s_2$, $s_3$ and $s_4$ denote four input symbols to be transmitted.

As described above, the encoder 120 performs negate and conjugate operations for the four input symbols, and then outputs, to the four antennas 130, 132, 134, and 136, symbols generated after the negate and conjugate operations during the eight time intervals. Here, symbol sequences of the matrix's rows outputted to the respective antennas are orthogonal to each other.

Explaining in detail, the four symbols $s_1$, $s_2$, $s_3$ and $s_4$ of the first row are transmitted to the four antennas 130, 132, 134 and 136 during the first time interval. Similarly, four symbols $-s^*_4$, $-s^*_3$, $s^*_2$ and $s^*_1$ of the last row are transmitted to the four antennas 130, 132, 134 and 136 during the last time interval. In other words, the encoder 120 sequentially transfers symbols of the $m^{th}$ column of the code matrix to the $m^{th}$ antenna.

FIG. 2 is a block diagram illustrating the configuration of a receiver receiving signals from the transmitter shown in FIG. 1. As shown in FIG. 2, the receiver includes a plurality of receiving antennas 140, 145, etc., a channel estimator 150, a multi-channel symbol arranger 160 and a detector 170.

Referring to FIG. 2, the channel estimator 150 estimates channel coefficients indicating gains of channels from the transmitting antennas 130 to 136 to the receiving antennas 140, 145, etc. The multi-channel symbol arranger 160 collects symbols received by the receiving antennas 140, 145, etc. and then provides the collected symbols to the detector 170. The detector 170 multiplies the received symbols by the channel coefficients, thereby producing hypothesis symbols. The detector 170 calculates decision statistic values for all possible symbols using the hypothesis symbols and detects desired symbols on the basis of threshold detection.

Alamouti's space-time block code technique can obtain the maximum diversity order corresponding to the number of transmitting antennas without lowering a transmission rate although complex symbols are transmitted through two transmitting antennas. The transmitter and receiver proposed by Tarokh, shown in FIGS. 1 and 2, can achieve the maximum diversity order using space-time block codes based on a matrix having orthogonal rows, through the extension of Alamouti's space-time block code technique. However, only half the transmission rate can be achieved since the transmitter transmits the four complex symbols during the eight time intervals. Because the eight time intervals are needed to completely transmit four-symbol blocks generated by encoding the four input symbols, reception performance due to the change of a channel environment for block symbols is degraded in the case of fast fading.

There are problems in that the transmission rate is degraded and hence the latency is lengthened since 2N time intervals are needed where N complex symbols are transmitted through four or more antennas.

SUMMARY OF THE INVENTION

Therefore, the present invention has been made in view of the above problems, and it is one object of the present invention to provide a transmitter and receiver, which can achieve the maximum diversity order and the maximum transmission rate without reducing a transmission rate in a wireless communication system using four transmitting antennas.

It is another object of the present invention to provide a transmitter and receiver, which can minimize a transmission delay time or latency without reducing a transmission rate in a wireless communication system using four transmitting antennas.

In accordance with one aspect of the present invention, the above and other objects can be accomplished by the provision of a transmitter for transmitting complex symbols in a wireless communication system comprising four transmitting antennas and an encoder. The encoder configures four combinations for four input symbols so that a sequence of four symbols can be transmitted once by each antenna during each time interval, and transfers the combinations to the transmitting antennas, wherein at least two symbols selected from the four input symbols are each rotated by predetermined phase values.

In accordance with another aspect of the present invention, there is provided a receiver for receiving complex symbols in a wireless communication system comprising a symbol arranger for receiving signals transmitted from four transmitting antennas to at least one receiving antenna during four time intervals; a channel estimator for estimating four channel gains indicating gains of channels from the four transmitting antennas to the at least one receiving antenna; first and second decoders each producing metric values associated with all possible symbol sub-combinations using the channel gains and the signals received by the symbol arranger, and each detecting two symbols having a minimum metric value, each of the symbol sub-combinations containing two symbols; and a parallel-to-serial converter for sequentially arranging and outputting the two symbols detected by each of the first and second decoders.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
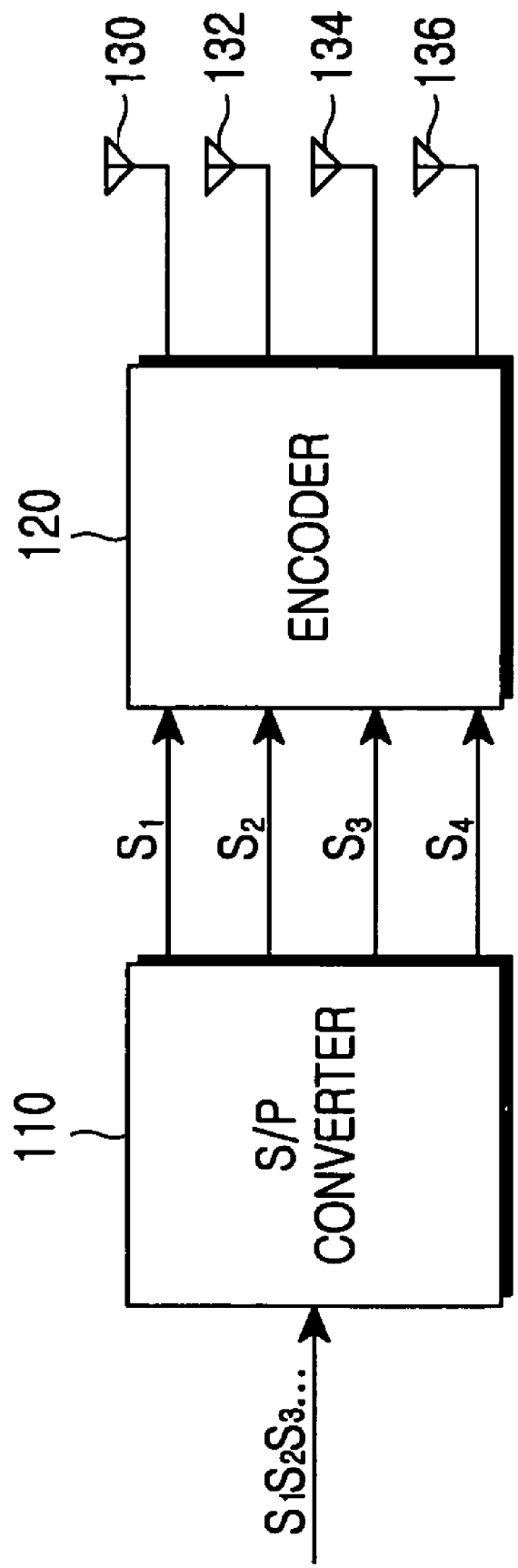
FIG. 1 is a block diagram illustrating the configuration of a conventional transmitter using space-time block codes.
Figure 2:
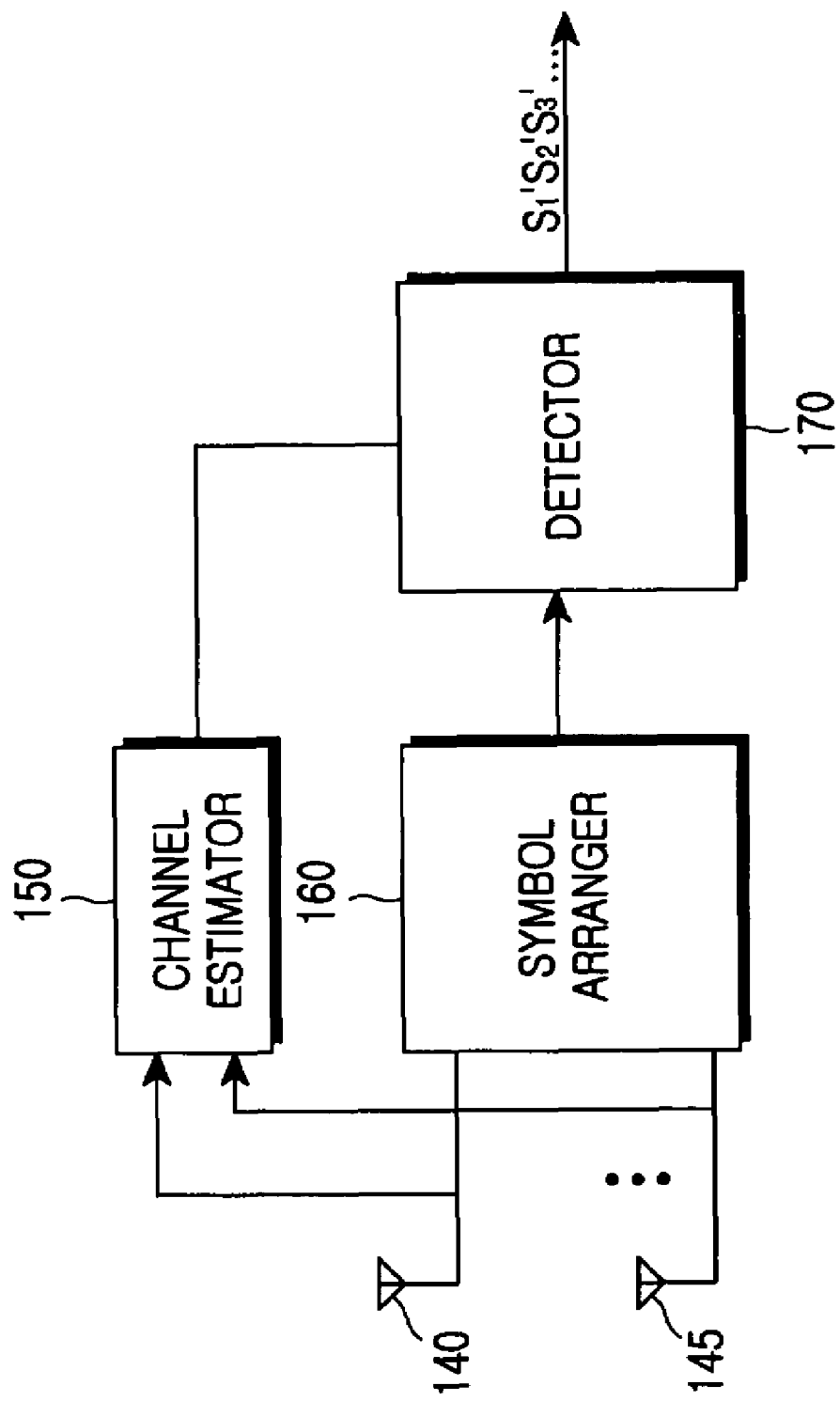
FIG. 2 is a block diagram illustrating the configuration of a receiver for receiving signals from the transmitter shown in FIG. 1.

Now, an operation principle of preferred embodiments of the present invention will be described in detail with reference to the annexed drawings. In the following description, a detailed description of known functions and configurations incorporated herein will be omitted when it may make the subject matter of the present invention unclear. Further, the terms to be described below are defined according to functions associated with the present invention. The terms can be varied by an intention or practice of a user or operator. Accordingly, term definitions should be determined based on the following description.

In accordance with the present invention to be described below, some of the complex symbols to be transmitted are rotated by predetermined phases so that the maximum diversity order and the maximum transmission rate can be achieved. Further, the present invention uses a partial orthogonal structure so that a decoding design can be simplified. Hereinafter, the configuration and operation of rotating two symbols selected from the complex symbols to be transmitted by the predetermined phases will be described. Of course, more than the two symbols can optionally be rotated by the predetermined phases so that an object of the present invention can be achieved.

In accordance with the present invention, four input symbols are transmitted during four time intervals through four transmitting antennas. In this case, a code matrix is given by the following Equation 2.

$$\begin{bmatrix} s_1 & s_2 & s_3 & s_4 \\ s_5 & s_6 & s_7 & s_8 \\ s_9 & s_{10} & s_{11} & s_{12} \\ s_{13} & s_{14} & s_{15} & s_{16} \end{bmatrix} \quad \text{Equation 2}$$

A receiver using ML (Maximum Likelihood) decoding produces metric values for received signals associated with all possible symbols on the basis of gains of channels from transmitting antennas to receiving antennas, and then detects symbols having minimum metric values.

When a gain of a channel from an $i^{th}$ transmitting antenna to a receiving antenna is denoted by $h_i$, a metric value corresponding to a symbol combination $c_t$ generated in an arbitrary time t is given by the following Equation 3.

$$\sum_{t=1}^{4} \left| r_t - \sum_{i=1}^{4} h_i c_i \right|^2 \quad \text{Equation 3}$$

In the above Equation 3, $r_t$ denotes a signal received during the $t^{th}$ time interval, and $c_t$ denotes a symbol combination generated during the $t^{th}$ time interval. When the code matrix of the above Equation 2 is applied to the above Equation 3, the receiver decides a symbol combination capable of minimizing the following Equation 4 among all possible symbol combinations.

$$|r_1 - h_1 s_1 - h_2 s_2 - h_3 s_3 - h_4 s_4|^2 + |r_2 - h_1 s_5 - h_2 s_6 - h_3 s_7 - h_4 s_8|^2 + |r_3 - h_1 s_9 - h_2 s_{10} - h_3 s_{11} - h_4 s_{12}|^2 + |r_4 - h_1 s_{13} - h_2 s_{14} - h_3 s_{15} - h_4 s_{16}|^2 \quad \text{Equation 4}$$

In the above Equation 4, $r_1$, $r_2$, $r_3$ and $r_4$ denote signals received by the receiver during the four time intervals. Further, $h_1$, $h_2$, $h_3$ and $h_4$ denote channel coefficients indicating gains of channels from the four transmitting antennas to the receiving antennas.

In order for an ML detection design to be simplified, many crossover terms must be removed if possible from the above Equation 4, and symbol sequences, i.e. rows, transmitted through the transmitting antennas must be orthogonal to each other. The crossover terms are enumerated in the following Equation 5.

$$h_1 h_2^* C_1 + h_1 h_3^* C_2 + h_1 h_4^* C_3 + h_2 h_3^* C_4 + h_2 h_4^* C_5 + h_3 h_4^* C_6 =$$
$$h_1 h_2^*(s_1 s_2^* + s_5 s_6^* + s_9 s_{10}^* + s_{13} s_{14}^*) +$$
$$h_1 h_3^*(s_1 s_3^* + s_5 s_7^* + s_9 s_{11}^* + s_{13} s_{15}^*) +$$
$$h_1 h_4^*(s_1 s_4^* + s_5 s_8^* + s_9 s_{12}^* + s_{13} s_{16}^*) +$$
$$h_2 h_3^*(s_2 s_3^* + s_6 s_7^* + s_{10} s_{11}^* + s_{14} s_{15}^*) +$$
$$h_2 h_4^*(s_2 s_4^* + s_6 s_8^* + s_{10} s_{12}^* + s_{14} s_{16}^*) +$$
$$h_3 h_4^*(s_3 s_4^* + s_7 s_8^* + s_{11} s_{12}^* + s_{15} s_{16}^*)$$

Equation 5

Where four-symbol sequences are transmitted using a 4×4 code matrix, the fact that not all crossover terms can be removed at a time of carrying out an ML decoding operation was discovered by Tarokh. However, it is possible that four terms may be removed from the above Equation 5 and an ML decoding design can be thus simplified.

On the other hand, a sequence of four symbols must be transmitted once to each antenna during each time interval so that the maximum diversity order can be achieved. Four types of 4×4 code matrices satisfying the above-described orthogonality condition are shown in the following Equation 6. Other code matrices can be configured through a substitute operation for rows or columns of four matrices.

$$\begin{bmatrix} s_1 & s_2 & s_3 & s_4 \\ s_2 & s_1 & s_4 & s_3 \\ s_3 & s_4 & s_1 & s_2 \\ s_4 & s_3 & s_2 & s_1 \end{bmatrix} \begin{bmatrix} s_1 & s_2 & s_3 & s_4 \\ s_2 & s_1 & s_4 & s_3 \\ s_3 & s_4 & s_2 & s_1 \\ s_4 & s_3 & s_1 & s_2 \end{bmatrix}$$

$$\begin{bmatrix} s_1 & s_2 & s_3 & s_4 \\ s_2 & s_3 & s_4 & s_1 \\ s_3 & s_4 & s_1 & s_2 \\ s_4 & s_1 & s_2 & s_3 \end{bmatrix} \begin{bmatrix} s_1 & s_2 & s_3 & s_4 \\ s_2 & s_4 & s_1 & s_3 \\ s_3 & s_1 & s_4 & s_2 \\ s_4 & s_3 & s_2 & s_1 \end{bmatrix}$$

Equation 6

Only the first matrix of the matrices shown in the above Equation 6 can reduce the complexity of the ML decoding design. Further, 2×2 cosets configuring code matrices must be able to be converted into the form of the matrices proposed by Alamouti so that the complexity of the ML decoding design can be reduced.

The negate and conjugate operations are carried out so that the four crossover terms shown in the above Equation 5 can be removed in relation to the first matrix contained in the above Equation 6. As an example, the resulting code matrix is given by the following Equation 7.

$$\begin{bmatrix} x_1 & x_2 & x_3^* & x_4^* \\ x_2^* & -x_1^* & x_4 & -x_3 \\ x_3 & x_4 & -x_1^* & -x_2^* \\ x_4^* & -x_3^* & -x_2 & x_1 \end{bmatrix}$$

Equation 7

In the above Equation 7, $x_1$, $x_2$, $x_3$ and $x_4$ are based on a form arbitrarily arranged after the negate and conjugate operations for the symbols $s_1$, $s_2$, $s_3$ and $s_4$ to be transmitted are carried out.

If the code matrix shown in the above Equation 7 is used, an ML decoder of the receiver must detect symbols capable of minimizing the following Equation 8.

$$|r_1-s_1x_1-h_2x_2-h_3x^*_3-h_4x^*_4|^2+|r_2-h_1x^*_2-h_2x^*_1-h_3x^*_4+h_4x_3|^2+|r_3-h_1x_3-h_2x_4+h_3x^*_1|^2+|r_4-h_1x^*_4+h_3x_2-h_4x_1|^2$$

Equation 8

If the above Equation 8 is re-arranged, the operation of minimizing the above Equation 8 is the same as the operation of minimizing the following Equations 9 and 10. The metrics associated with the following Equations 9 and 10 are independent from each other.

$$\text{Min}(x_1,x_3)(|R_1-x_1|^2+|R_3-x_3|^2+|R_{13}-x^*_1x_3|^2-|x_1|^2|x_3|^2)$$

Equation 9

$$\text{Min}(x_2,x_4)(|R_2-x_2|^2+|R_4-x_4|^2+|R_{24}-x^*_2x_4|^2-|x_2|^2|x_4|^2)$$

Equation 10

In the above Equations 9 and 10, Min(a,b)(y(a,b)) represents an operation of deciding values for "a" and "b" capable of minimizing y(a,b). $R_1$, $R_3$, $R_{13}$, $R_2$, $R_4$ and $R_{24}$ are defined as in the following Equation 11.

$$R_1 = \left( \frac{r_1 h_1^* + r_2^* h_2 + r_3^* h_3 - r_4 h_4^*}{K} \right),$$

$$R_3 = \left( \frac{r_1 h_4^* + r_2^* h_3 - r_3^* h_2 + r_4 h_1^*}{K} \right),$$

$$R_{13} = \left( \frac{-h_1 h_4^* + h_1^* h_4 - h_2^* h_3 + h_2 h_3^*}{K} \right)$$

$$R_2 = \left( \frac{r_1 h_2^* - r_2^* h_1 + r_3^* h_4 + r_4 h_3^*}{K} \right),$$

$$R_4 = \left( \frac{r_1 h_3^* - r_2^* h_4 - r_3^* h_1 - r_4 h_2^*}{K} \right),$$

$$R_{24} = \left( \frac{-h_2 h_3^* - h_1^* h_4 + h_4^* h_1 + h_3 h_2^*}{K} \right)$$

$$K = |h_1|^2 + |h_2|^2 + |h_3|^2 + |h_4|^2$$

Equation 11

Using the above Equations 9 and 10, the receiver decouples a step of decoding a pair of $x_1$ and $x_3$ according to the above Equation 9 and a step of decoding a pair of $x_2$ and $x_4$ according to the above Equation 10. Thus, a structure of the receiver can be further simplified.

Where input symbols are generated by BPSK (Binary Phase Shift Keying), that is, where input symbols are real symbols, the above-described code matrix constantly has the maximum diversity order. However, where a symbol mapping scheme of the third order or more based on a complex constellation is used, that is, where QPSK (Quadrature Phase Shift Keying), 8PSK (8-ary PSK), or 16PSK (16-ary PSK) is used, symbols to be transmitted become complex symbols and hence the diversity order may decrease. In accordance with the present invention, the maximum diversity order of "4" can be obtained as two symbols, needed to decide different metric values, among four symbols are each rotated by predetermined phases. If this is done, symbols transmitted through the four antennas are expressed as a matrix as in the following Equation 12.

$$\begin{bmatrix} e^{j\theta_1}s_1 & s_2 & s_3^* & e^{-j\theta_4}s_4^* \\ s_2^* & -e^{-j\theta_1}s_1^* & e^{j\theta_4}s_4 & -s_3 \\ s_3 & e^{j\theta_4}s_4 & -e^{-j\theta_1}s_1^* & -s_2^* \\ e^{-j\theta_4}s_4^* & -s_3^* & -s_2 & e^{j\theta_1}s_1 \end{bmatrix}$$

Equation 12

In the above Equation 12, there is shown the code matrix where the symbols $s_1$ and $s_4$ of the input symbols $s_1$, $s_2$, $s_3$ and $s_4$ are rotated by phases $\theta_1$ and $\theta_4$, respectively. Optionally, a pair of $s_1$ and $s_2$, $s_3$ and $s_4$, or $s_2$ and $s_3$, each associated with different metric values, can be rotated. Even though phase values used for rotating the two symbols are different from each other or the same as each other, the maximum diversity order can be constantly maintained.

In accordance with the present invention, some different code matrices having the maximum diversity order and the minimum latency and being capable of simplifying the ML decoding design are shown in the following Equation 13.

$$\begin{bmatrix} x_1 & x_2 & x_3^* & x_4^* \\ x_2^* & -x_1^* & x_4 & -x_3 \\ x_3 & x_4 & -x_1^* & -x_2^* \\ x_4^* & -x_3^* & -x_2 & x_1 \end{bmatrix} \begin{bmatrix} x_1 & x_2 & x_3^* & -x_4^* \\ x_2^* & -x_1^* & x_4 & x_3 \\ x_3 & x_4 & -x_1^* & x_2^* \\ x_4^* & -x_3^* & -x_2 & -x_1 \end{bmatrix} \quad \text{Equation 13}$$

$$\begin{bmatrix} x_1 & x_2 & x_3^* & -x_4^* \\ x_2^* & -x_1^* & -x_4 & -x_3 \\ x_3 & x_4 & -x_1^* & x_2^* \\ x_4^* & -x_3^* & x_2 & x_1 \end{bmatrix} \begin{bmatrix} x_1 & x_2 & x_3^* & x_4^* \\ x_2^* & -x_1^* & -x_4 & x_3 \\ x_3 & x_4 & -x_1^* & -x_2^* \\ x_4^* & -x_3^* & x_2 & -x_1 \end{bmatrix}$$

$$\begin{bmatrix} x_1 & x_2 & -x_3^* & -x_4^* \\ x_2^* & -x_1^* & x_4 & -x_3 \\ x_3 & x_4 & x_1^* & x_2^* \\ x_4^* & -x_3^* & -x_2 & x_1 \end{bmatrix} \begin{bmatrix} x_1 & x_2 & -x_3^* & x_4^* \\ x_2^* & -x_1^* & x_4 & x_3 \\ x_3 & x_4 & x_1^* & -x_2^* \\ x_4^* & -x_3^* & -x_2 & -x_1 \end{bmatrix}$$

$$\begin{bmatrix} x_1 & x_2 & -x_3^* & -x_4^* \\ x_2^* & -x_1^* & -x_4 & x_3 \\ x_3 & x_4 & x_1^* & x_2^* \\ x_4^* & -x_3^* & x_2 & -x_1 \end{bmatrix} \begin{bmatrix} x_1 & x_2 & -x_3^* & x_4^* \\ x_2^* & -x_1^* & -x_4 & -x_3 \\ x_3 & x_4 & x_1^* & -x_2^* \\ x_4^* & -x_3^* & x_2 & x_1 \end{bmatrix}$$

In the above Equation 13, $x_1$, $x_2$, $x_3$ and $x_4$ are based on a form arbitrarily arranged after the negate and conjugate operations are carried out for a totality or a part of the symbols $s_1$, $s_2$, $s_3$ and $s_4$ to be transmitted.

In accordance with another embodiment of the present invention, at least two symbols selected from the symbols to be transmitted can be rotated by different phases. In this case, the code matrix can be generalized as in the following Equation 14.

$$\begin{bmatrix} e^{j\theta_1} s_1 & e^{j\theta_2} s_2 & e^{-j\theta_3} s_3^* & e^{-j\theta_4} s_4^* \\ e^{-j\theta_2} s_2^* & -e^{-j\theta_1} s_1^* & e^{j\theta_4} s_4 & -e^{j\theta_3} s_3 \\ e^{j\theta_3} s_3 & e^{j\theta_4} s_4 & -e^{-j\theta_1} s_1^* & -e^{-j\theta_2} s_2^* \\ e^{-j\theta_4} s_4^* & -e^{-j\theta_3} s_3^* & -e^{j\theta_2} s_2 & e^{j\theta_1} s_1 \end{bmatrix} \quad \text{Equation 14}$$

In accordance with another embodiment of the present invention, the code matrix is multiplied by an arbitrary unitary matrix U. In this case, the receiver multiplies received symbols by $U^H$ and then carries out a detection operation.

$$U \begin{bmatrix} e^{j\theta_1} x_1 & e^{j\theta_2} x_2 & e^{-j\theta_3} x_3^* & e^{-j\theta_4} x_4^* \\ e^{-j\theta_2} x_2^* & -e^{-j\theta_1} x_1^* & e^{j\theta_4} x_4 & -e^{j\theta_3} x_3 \\ e^{j\theta_3} x_3 & e^{j\theta_4} x_4 & -e^{-j\theta_1} x_1^* & -e^{-j\theta_2} x_2^* \\ e^{-j\theta_4} x_4^* & -e^{-j\theta_3} x_3^* & -e^{j\theta_2} x_2 & e^{j\theta_1} x_1 \end{bmatrix} U^H U = I \quad \text{Equation 15}$$

In Eq. 15, U denotes an arbitrary unitary matrix. The code matrix in Equation 14 multiplied by an unitary matrix becomes another code matrix having similar properties as those in Eq. 14.

Figure 3:
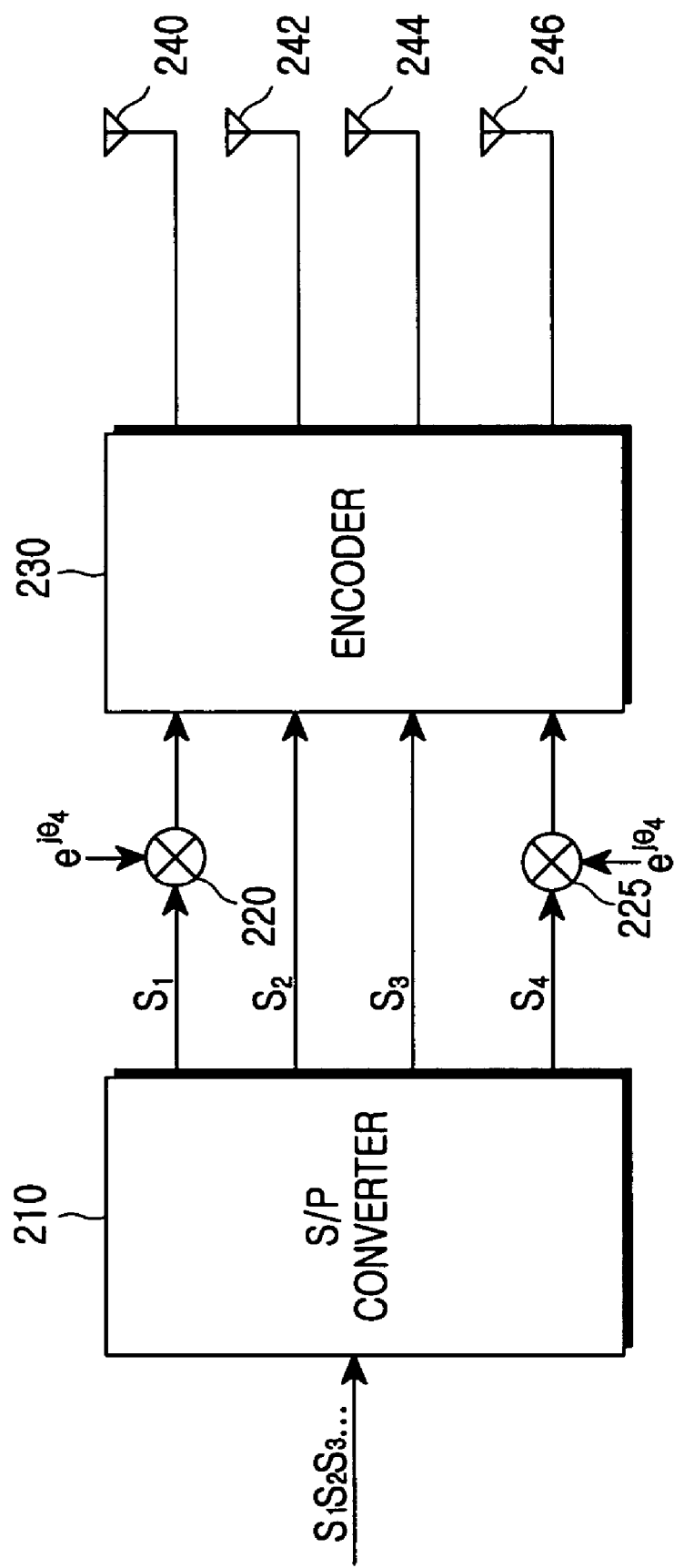
FIG. 3 is a block diagram illustrating the configuration of a transmitter using space-time block codes in accordance with a preferred embodiment of the present invention.
Figure 4:
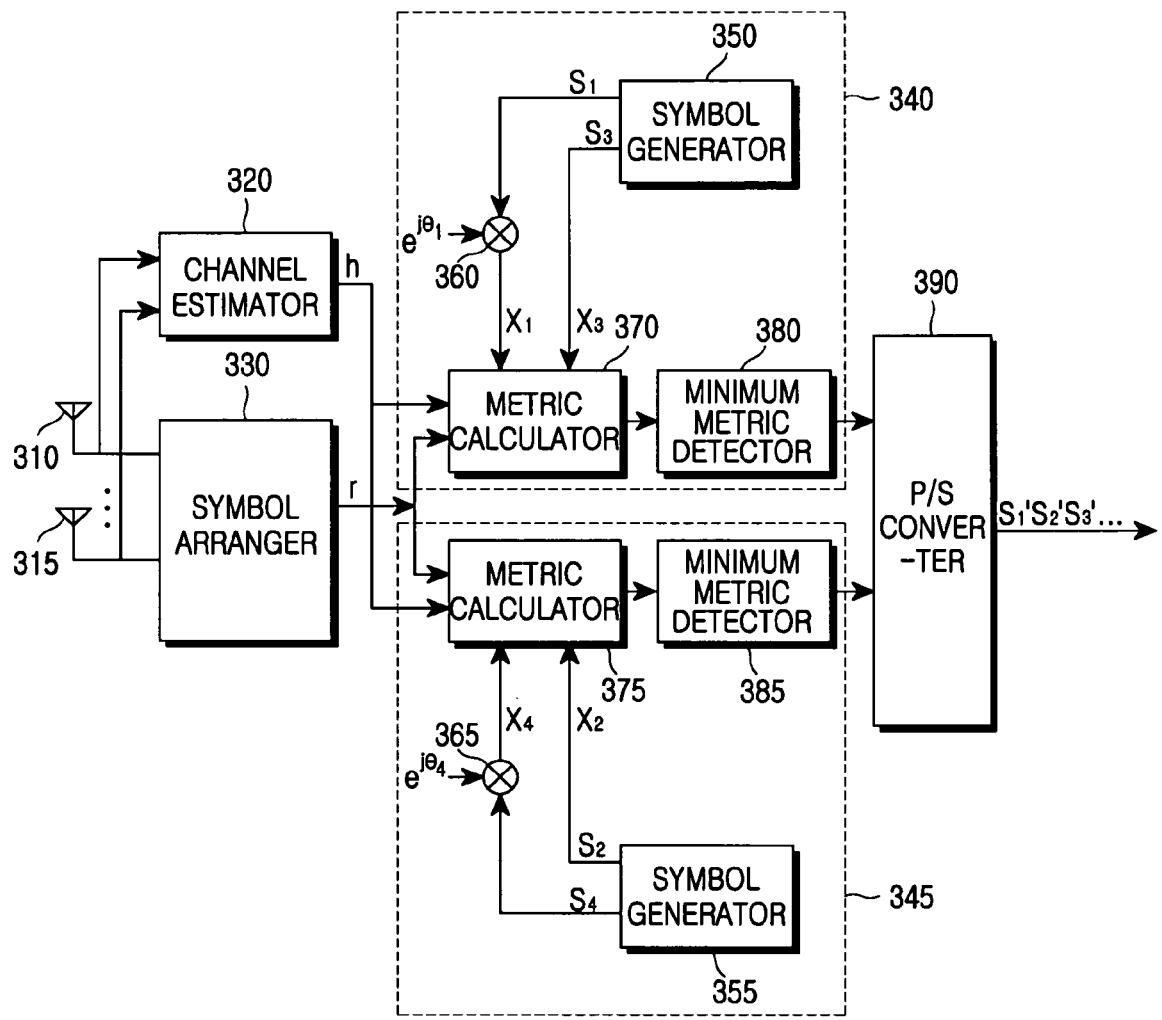
FIG. 4 is a block diagram illustrating the configuration of a receiver for receiving signals from the transmitter shown in FIG. 3.

The transmitter and receiver using the above-described code matrixes are shown in FIGS. 3 and 4.

FIG. 3 is a block diagram illustrating the configuration of a transmitter using space-time block codes in accordance with one embodiment of the present invention. As shown in FIG. 3, the transmitter includes an S/P (Serial-to-Parallel) converter 210, phase rotators 220 and 225, an encoder 230, and four transmitting antennas 240, 242, 244 and 246.

Referring to FIG. 3, the S/P converter 210 combines four input symbols in the form of one symbol block and then provides the combined symbols to the encoder 230. At this time, before two symbols $s_1$ and $s_4$ selected from the one symbol block are inputted into the encoder 230, the phase rotators 220 and 225 rotate the two symbols $s_1$ and $s_4$ by phases $\theta_1$ and $\theta_4$, respectively. Here, the two symbols associated with different metric values are selected by the receiver. The encoder 230 configures four symbol combinations using the one-block symbols containing the phase-rotated two symbols and then transfers the four symbol combinations to the four transmitting antennas 240 to 246 during four time intervals. Here, each of the four symbol combinations includes four symbols.

Here, the encoder 230 configures the combinations so that a sequence of four symbols must be transmitted once to each antenna during each time interval, thereby achieving the maximum diversity order. Further, the encoder 230 carries out the negate and conjugate operations for the input symbols to configure the combinations so that at least some sequences of symbol sequences to be transmitted to the respective antennas are orthogonal to each other, i.e., pairs of symbol sequences are orthogonal to each other. The reason why the two symbols selected from the input symbols are each rotated by predetermined phases is to achieve the maximum diversity order when the input symbols are complex symbols.

Where the four combinations to be transmitted to the four antennas are expressed as a 4×4 code matrix, symbols of the $m^{th}$ column of the code matrix are sequentially transmitted to the $m^{th}$ antenna. In other words, symbols of the $n^{th}$ row of the code matrix are simultaneously transmitted to the four antennas during the $n^{th}$ time interval.

When the two symbols $s_1$ and $s_4$ of the symbols $s_1$, $s_2$, $s_3$ and $s_4$ have been rotated by phases $\theta_1$ and $\theta_4$, respectively, as an example, an output of the encoder 230 can be expressed as the 4×4 code matrix as in the above Equation 12. When the code matrix shown in the above Equation 12 is used, the four symbols $e^{j\theta_1}s_1$, $s_2$, $s^*_3$ and $e^{-j\theta_4}s_4$ of the first row are transmitted to the four antennas 240 to 246 during the first time interval, and the symbols $e^{-j\theta_4}s^*_4$, $-s^*_3$, $-s_2$ and $e^{j\theta_1}s_1$ of the fourth row, being the last row, are transmitted to the four antennas 240 to 246 during the fourth time interval.

FIG. 4 is a block diagram illustrating the configuration of a receiver for receiving signals from the transmitter shown in FIG. 3. The receiver of the present invention includes two ML (Maximum Likelihood) decoders 340 and 345, which are independently operated.

Referring to FIG. 4, a channel estimator 320 estimates channel coefficients indicating gains $h_1$, $h_2$, $h_3$ and $h_4$ of channels from the four transmitting antennas 240 to 246 to receiving antennas 310, 315, etc. A symbol arranger 330 collects signals $r_1$, $r_2$, $r_3$ and $r_4$ received by the receiving antennas 310, 315, etc. during four time intervals.

If a single receiving antenna is provided in the receiver, the symbol arranger 330 collects the received signals $r_1$, $r_2$, $r_3$ and $r_4$ through the single receiving antenna during four time intervals. This is because the transmitter transmits block symbols during the four time intervals. On the other hand, where two receiving antennas are used, the symbol arranger 330 configures the received signals in the form of a matrix. Here, one row of the matrix has the signals received through the receiving antennas during one time interval and one column of the matrix has the signals received during respective time intervals. The time interval corresponds to the so-called symbol duration that is the inverse of signal bandwidth. The multiple antennas 310, 315, etc. are shown in FIG. 4, but the case where one receiving antenna is used will be described for convenience in explaining the present invention.

Where the four symbols $s_1$, $s_2$, $s_3$ and $s_4$ transmitted from the transmitter are recovered, the first decoder 340 of the decoders 340 and 345 detects the symbols $s_1$ and $s_3$ according to the channel gains and received signals, and similarly the second decoder 345 detects the symbols $s_2$ and $s_4$. The four symbols $s_1$, $s_2$, $s_3$ and $s_4$ are simultaneously detected by the decoders 340 and 345. Here, the detected symbols are denoted by "s'" so that they can be discriminated from the original symbols.

Explaining the operation of the first decoder 340 where the code matrix of the above Equation 12 is used, a symbol generator 350 included in the first decoder 340 generates all possible symbol sub-combinations of $s_1$ and $s_3$, and a phase rotator 360 outputs $e^{j\theta_1}s_1$ by rotating one symbol $s_1$ of the generated symbols by the same phase $\theta_1$ used in the transmitter.

A metric calculator 370 calculates the above Equation 9 in relation to all possible symbol sub-combinations including the phase-rotated symbol using the estimated channel gains $h_1$, $h_2$, $h_3$ and $h_4$ and the received signals $r_1$, $r_2$, $r_3$ and $r_4$, thereby producing metric values. Then, a detector 380 detects $s_1'$ and $s_3'$ having the minimum metric values using the produced metric values.

As described above, the operation of the first decoder 340 is the same as the operation of the second decoder 345. If the first detector 340 has detected $s_1'$ and $s_3'$ and the second detector 345 has detected $s_2'$ and $s_4'$, a P/S (Parallel-to-Serial) converter 390 sequentially arranges the detected symbols, and then outputs symbol combinations associated with $s_1'$, $s_2'$, $s_3'$ and $s_4'$.

Phase values used for rotating the symbols in the transmitter and receiver shown in FIGS. 3 and 4 are decided according to the minimum coding gain of error matrices. Here, each error matrix is based on a matrix indicating a difference between erroneously detected symbols and originally transmitted symbols, and the minimum coding gain represents the product of all eigenvalues of the error matrices.

Figure 5:
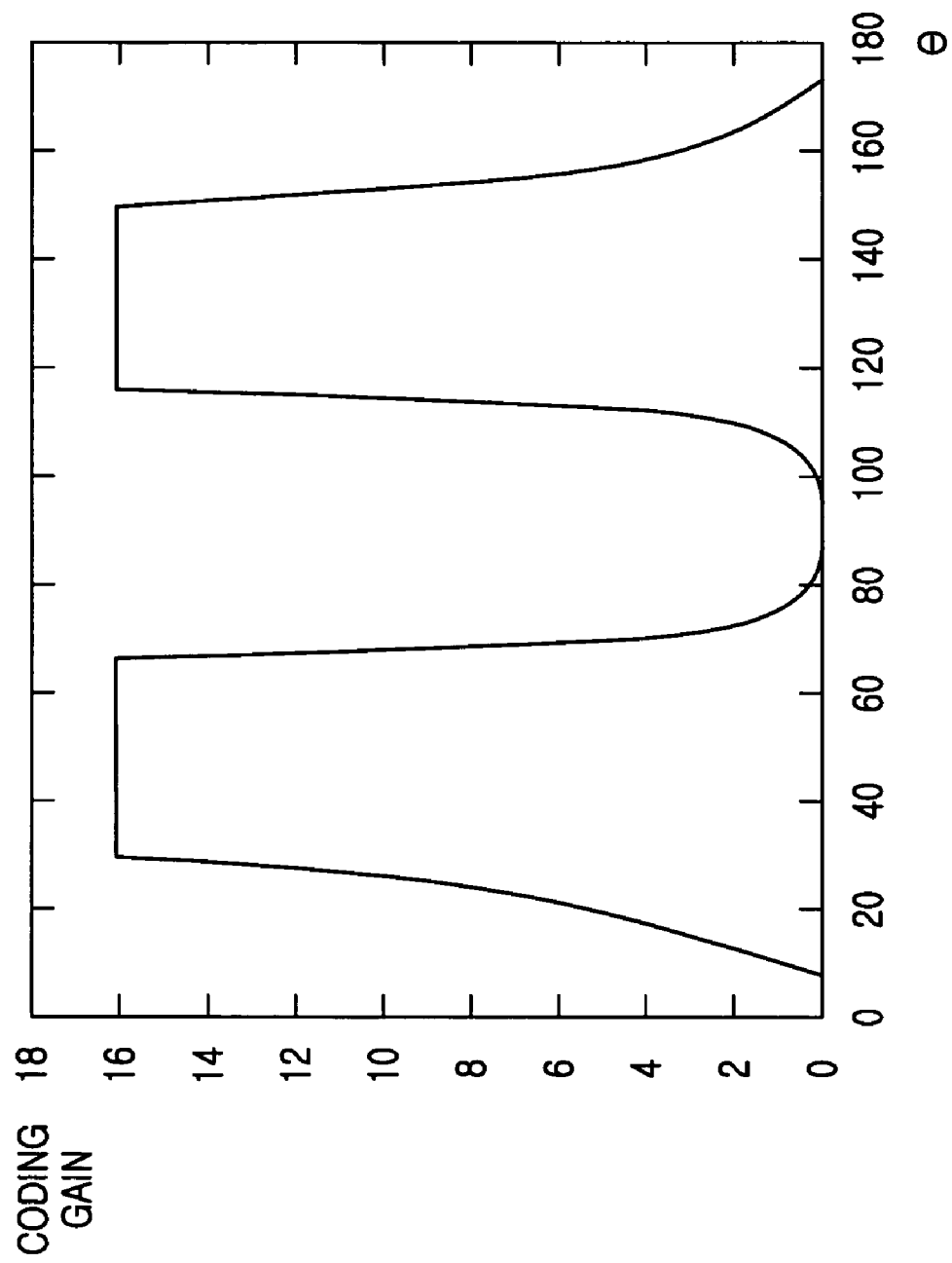
FIG. 5 is a graph illustrating a result of a simulation indicating a change of the minimum coding gain associated with two phase values when QPSK (Quadrature Phase Shift Keying) is used in accordance with the preferred embodiment of the present invention.

FIG. 5 is a graph illustrating a result of a simulation indicating a change of the minimum coding gain associated with two phase values when QPSK (Quadrature Phase Shift Keying) is used in accordance with one embodiment of the present invention. Here, it is assumed that the two phase values are the same as each other. A horizontal axis indicates a phase value, and a vertical axis indicates the minimum coding gain of an error matrix. If the phase value becomes a multiple of 90°, the minimum coding gain is zero. This is because an original constellation is made when a QPSK constellation is rotated by 90°.

Figure 6:
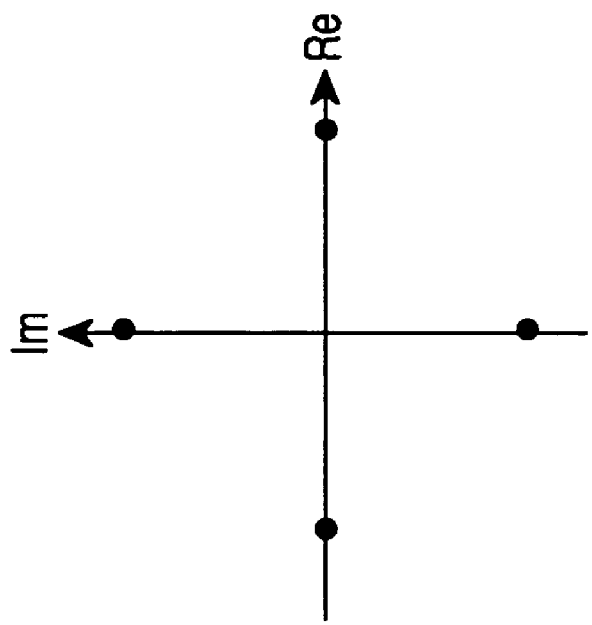
FIG. 6 is a view illustrating a QPSK constellation when symbols are rotated by a phase of 45°.
Figure 6:
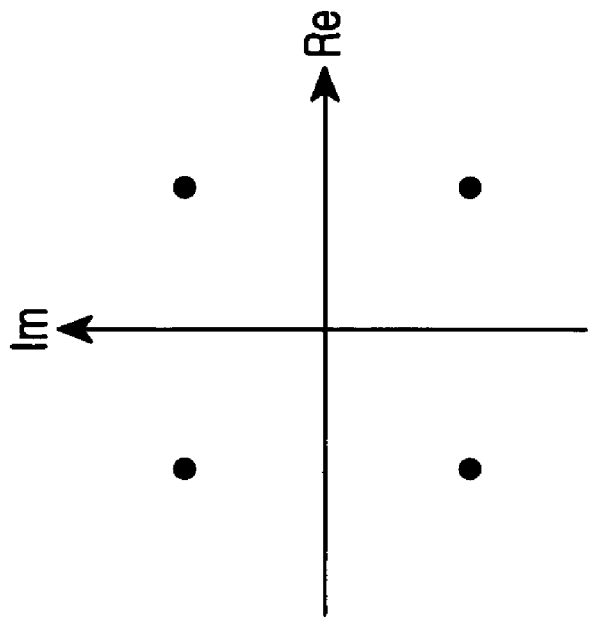

When the phase value is around 45°, Ňaccording to a result shown in FIG. 5, it is seen that the minimum coding gain is flat. Preferably, the phase value is 45° in accordance with the present invention. FIG. 6 is an exemplary view illustrating a QPSK constellation when symbols are rotated by a phase of 45°. As shown in FIG. 6, the phase-rotated symbols are positioned on the real and imaginary axes. A preferable range of a phase rotation can be exemplified in accordance with the first embodiment of the present invention. It is preferable that the phase rotation is based on a phase between approximately 21° and 69° Ň with a center of 45° when the QPSK is used. Further, it is preferable that the phase is based on a phase between approximately 21° and 24° Ň when 8PSK (8-ary Phase Shift Keying) is used. Furthermore, it is preferable that the phase rotation is based on a phase of approximately 11.25° when 16PSK (16-ary PSK) is used. However, the present invention is not limited to the above-described phase values. The preferable range of the phase rotation can be changed according to system characteristics.

Figure 7:
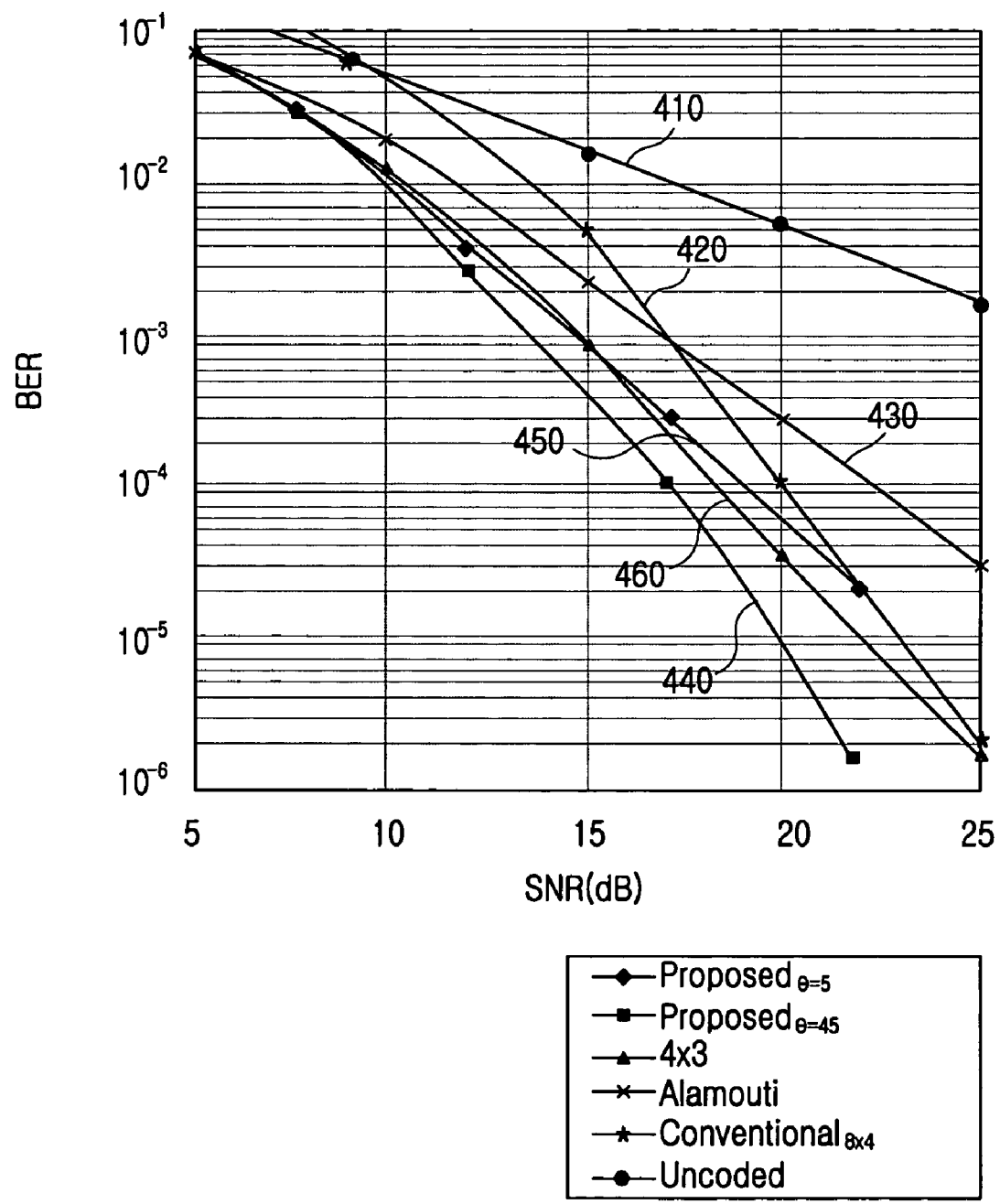
FIG. 7 is a graph illustrating the case where a proposed block coding technique is compared with the conventional technique in terms of an SNR (Signal to Noise Ratio) and a BER (Bit Error Rate).

FIG. 7 is a graph illustrating the case where a proposed coding technique is compared with the conventional technique in terms of an SNR (Signal to Noise Ratio) and a BER (Bit Error Rate). Here, a reference numeral 410 denotes the case where symbols not encoded are transmitted, and a reference numeral 420 denotes the (conventional) case where there is used an 8×4 code matrix in which the rows proposed by Tarokh are orthogonal to each other. A reference numeral 430 denotes the efficiency where two antennas are used as proposed by Alamouti. A reference numeral 440 denotes the efficiency where a 4×4 code matrix using the optimized phase of 45° is used. A reference numeral 450 denotes the efficiency where a 4×4 code matrix using the not optimized phase of 5° is used. A reference numeral 460 denotes the efficiency where a 4×3 matrix associated with three transmitting antennas is used. As shown in FIG. 7, it is seen that block codes using an optimized phase value in accordance with the present invention have a relatively low BER in the given SNR environment.

As apparent from the above description, the present invention has the following advantageous effects.

The present invention can achieve the maximum diversity order when a complex constellation is used, reduce a transmission delay time and reduce the effect of fast fading. In accordance with the present invention, rows of the code matrix can be orthogonal to each other, and a decoding design can be simply implemented.

Although the preferred embodiments of the present invention have been disclosed for illustrative purposes, those skilled in the art will appreciate that various modifications, additions and substitutions are possible, without departing from the scope of the invention. Therefore, the present invention is not limited to the above-described embodiments, but the present invention is defined by the claims, which follow, along with their full scope of equivalents.

What is claimed is:

1. A transmitter for transmitting complex symbols in a wireless communication system, comprising:
    four transmitting antennas;
    an phase rotator for inputting four symbols to transmit, and multiplying two symbols from among the four symbols by predetermined phase values for the two symbols to output two phase-rotated symbols; and
    an encoder for carrying out a negation and conjugation operation of two symbols from among the four symbols containing the two phase-rotated symbols during each time interval, and for transferring the four symbols after the negation and conjugation operations to the transmitting antennas.

2. The transmitter as set forth in claim 1, wherein the phase values are determined within a range of 21° to 69° where QPSK (Quadrature Phase Shift Keying) is used for transmitting the complex symbols through the four transmitting antennas.

3. The transmitter as set forth in claim 1, wherein the phase values are determined within a range of 21° to 24° where 8PSK (8-ary Phase Shift Keying) is used for transmitting the complex symbols through the four transmitting antennas.

4. The transmitter as set forth in claim 1, wherein the phase values are determined to 11.25° where 16PSK (16-ary Phase Shift Keying) is used for transmitting the complex symbols through the four transmitting antennas.

5. The transmitter as set forth in claim 1, wherein the encoder generates a four by four matrix, the matrix being given by:

$$\begin{bmatrix} e^{j\theta_1}s_1 & s_2 & s_3^* & e^{-j\theta_4}s_4^* \\ s_2^* & -e^{-j\theta_1}s_1^* & e^{j\theta_4}s_4 & -s_3 \\ s_3 & e^{j\theta_4}s_4 & -e^{-j\theta_1}s_1^* & -s_2^* \\ e^{-j\theta_4}s_4^* & -s_3^* & -s_2 & e^{j\theta_1}s_1 \end{bmatrix}$$

where $s_1, s_2, s_3$ and $s_4$ denote the input symbols, and $\theta_1$ and $\theta_4$ denote phase values for phase-rotating the symbols $s_1$ and $s_4$, respectively.

6. The transmitter as set forth in claim 1, wherein the encoder generates a four by four matrix, the matrix being given by one among the following matrices:

$$\begin{bmatrix} x_1 & x_2 & x_3^* & x_4^* \\ x_2^* & -x_1^* & x_4 & -x_3 \\ x_3 & x_4 & -x_1^* & -x_2^* \\ x_4^* & -x_3^* & -x_2 & x_1 \end{bmatrix} \begin{bmatrix} x_1 & x_2 & x_3^* & -x_4^* \\ x_2^* & -x_1^* & x_4 & x_3 \\ x_3 & x_4 & -x_1^* & x_2^* \\ x_4^* & -x_3^* & -x_2 & -x_1 \end{bmatrix} \begin{bmatrix} x_1 & x_2 & x_3^* & -x_4^* \\ x_2^* & -x_1^* & -x_4 & x_3 \\ x_3 & x_4 & -x_1^* & x_2^* \\ x_4^* & -x_3^* & x_2 & -x_1 \end{bmatrix}$$

$$\begin{bmatrix} x_1 & x_2 & -x_3^* & x_4^* \\ x_2^* & -x_1^* & x_4 & x_3 \\ x_3 & x_4 & x_1^* & -x_2^* \\ x_4^* & -x_3^* & -x_2 & -x_1 \end{bmatrix} \begin{bmatrix} x_1 & x_2 & -x_3^* & -x_4^* \\ x_2^* & -x_1^* & x_4 & -x_3 \\ x_3 & x_4 & x_1^* & x_2^* \\ x_4^* & -x_3^* & -x_2 & x_1 \end{bmatrix} \begin{bmatrix} x_1 & x_2 & -x_3^* & x_4^* \\ x_2^* & -x_1^* & -x_4 & x_3 \\ x_3 & x_4 & x_1^* & -x_2^* \\ x_4^* & -x_3^* & x_2 & -x_1 \end{bmatrix}$$

$$\begin{bmatrix} x_1 & x_2 & -x_3^* & -x_4^* \\ x_2^* & -x_1^* & -x_4 & x_3 \\ x_3 & x_4 & x_1^* & x_2^* \\ x_4^* & -x_3^* & x_2 & -x_1 \end{bmatrix} \begin{bmatrix} x_1 & x_2 & -x_3^* & x_4^* \\ x_2^* & -x_1^* & -x_4 & -x_3 \\ x_3 & x_4 & x_1^* & -x_2^* \\ x_4^* & -x_3^* & x_2 & x_1 \end{bmatrix}$$

where $x_1, x_2, x_3$ and $x_4$ denote four symbols output from the phase rotator.

7. The transmitter as set forth in claim 1, wherein the encoder generates a four by four matrix, the matrix being given by:

$$\begin{bmatrix} e^{j\theta_1}s_1 & e^{j\theta_2}s_2 & e^{-j\theta_3}s_3^* & e^{-j\theta_4}s_4^* \\ e^{-j\theta_2}s_2^* & -e^{-j\theta_1}s_1^* & e^{j\theta_4}s_4 & -e^{j\theta_3}s_3 \\ e^{j\theta_3}s_3 & e^{j\theta_4}s_4 & -e^{-j\theta_1}s_1^* & -e^{-j\theta_2}s_2^* \\ e^{-j\theta_4}s_4^* & -e^{-j\theta_3}s_3^* & -e^{j\theta_2}s_2 & e^{j\theta_1}s_1 \end{bmatrix}$$

where $s_1, s_2, s_3$ and $s_4$ denote the input symbols, and $\theta_1$ and $\theta_4$ denote phase values for phase-rotating the symbols $s_1, s_2, s_3$ and $s_4$, respectively.

8. A receiver for receiving complex symbols in a wireless communication system, comprising:
    a symbol arranger for receiving signals transmitted from four transmitting antennas to at least one receiving antenna during four time intervals;
    a channel estimator for estimating four channel gains of channels from the four transmitting antennas to the at least one receiving antenna;
    first and second decoders each producing metric values associated with all possible symbol sub-combinations using the channel gains and the signals received by the symbol arranger and detecting two symbols having a minimum metric value among all the possible symbol sub-combinations, each of the symbol sub-combinations containing all possible two symbols; and
    a parallel-to-serial converter for sequentially arranging and outputting the two symbols detected by each of the first and second decoders.

9. The receiver as set forth in claim 8, wherein each of the first and second decoders comprises:
    a symbol generator for generating all the possible symbol sub-combinatons
    a phase rotator for rotating one symbol from the two symbols of each of the symbol sub-combination by a predetermined phase value
    a metric calculator for producing the metric values for the symbol sub-combinations containing the phase-rotated symbol using the signals received by the symbol arranger and the channel gains; and
    a detector for detecting the two symbols having the minimum metric value using the produced metric values.

10. The receiver as set forth in claim 9, wherein the first decoder detects two symbols $s_1$ and $s_3$ capable of minimizing the matrix value of $|R^1-e^{j\theta_1}s_1|^2+|R_3-s_3^2|^2+|R_{13}-e^{-j\theta_1}s^*_1s_3|^2-|s_1|^2|s_3|^2$ in which $R_1$, $R_3$ and $R_{13}$ are given by:

$$R_1 = \left(\frac{r_1 h_1^* + r_2^* h_2 + r_3^* h_3 - r_4 h_4^*}{K}\right), R_3 = \left(\frac{r_1 h_4^* + r_2^* h_3 - r_3^* h_2 + r_4 h_1^*}{K}\right) \text{ and } R_{13} = \left(\frac{-h_1 h_4^* + h_1^* h_4 - h_2^* h_3 + h_2 h_3^*}{K}\right)$$

and $K=|h_1|^2+|h_2|^2+|h_3|^2+|h_4|^2$ where $r_1, r_2, r_3$ and $r_4$ denote the signals recieved during the four time intervals, and $h_1, h_2, h_3$ and $h_4$ denote the channel gains of four antennas.

11. The receiver as set forth in claim 9, wherein the second decoder detects two symbols $s_2$ and $s_4$ capable of minimizing the metric value of $|R^2-s_2|^2+|R_4-e^{j\theta_4}s_4|^2+|R_{24}-s^*_2e^{j\theta_4}s_4|^2-|s_2|^2|s_4|^2$ in which $R_2$, $R_4$, and $R_{24}$ are given by:

$$R_2 = \left(\frac{r_1 h_2^* - r_2^* h_1 + r_3^* h_4 + r_4 h_3^*}{K}\right), R_4 =$$

$$\left(\frac{r_1 h_3^* - r_2^* h_4 - r_3^* h_1 - r_4 h_2^*}{K}\right) \text{ and } R_{24} = \left(\frac{-h_2 h_3^* - h_1^* h_4 + h_4^* h_1 + h_3 h_2^*}{K}\right)$$

and $K=|h_1|^2+|h_2|^2+|h_3|^2+|h_4|^2$ where $r_1$, $r_2$,$r_3$ and $r_4$ denote the signals recieved during the four time intervals, and $h_1$, $h_2$, $h_3$ and $h_4$ denote the channel gains of four antennas.

12. A method for transmitting complex symbols in a wireless communication system having four transmitting antennas, the method comprising the steps of:

multiply two from symbols among four input symbols by predetermined phase values for the two symbols, to output two phase-rotated symbols;

selecting one of a four by four matrix such that the four symbols containing the two phase-rotated symbols are transmitted through the four transmitting antenna;

generating a new four by four matrix by carrying out a negation and a conjugation operation of at least one element among elements of the selected four by four matrix; and sequentially selecting one column of the new four by four matrix during each time interval, and transferring complex symbols of the selected column to the transmitting antennas.

13. The method as set forth in claim 12, wherein the phase values are determined within a range of 21° to 69° where QPSK (Quadrature Phase Shift Keying) is used for transmitting the complex symbols through the transmitting antennas.

14. The method as set forth in claim 12, wherein the phase values are determined within a range of 21° to 24° where 8PSK (8-ary Phase Shift Keying) is used for transmitting the complex symbols through the transmitting antennas.

15. The method as set forth in claim 12, wherein the phase values are determined to 11.25° where 16PSK (16-ary Phase Shift Keying) is used for transmitting the complex symbols through the transmitting antennas.

16. The method as set forth in claim 12 wherein the generated new four by four matrix is given by:

$$\begin{bmatrix} e^{j\theta_1}s_1 & s_2 & s_3^* & e^{-j\theta_4}s_4^* \\ s_2^* & -e^{-j\theta_1}s_1^* & e^{j\theta_4}s_4 & -s_3 \\ s_3 & e^{j\theta_4}s_4 & -e^{-j\theta_1}s_1^* & -s_2^* \\ e^{-j\theta_4}s_4^* & -s_3^* & -s_2 & e^{j\theta_1}s_1 \end{bmatrix}$$

where $s_1$, $s_2$, $s_3$ and $s_4$ denote the input symbols, and $\theta_1$ and $\theta_4$ denote phase values for phase-rotating the symbols $s_1$ and $s_4$, respectively.

17. The method as set forth in claim 12, wherein the generated new four by four matrix is given by one of the following matrices:

$$\begin{bmatrix} x_1 & x_2 & x_3^* & x_4^* \\ x_2^* & -x_1^* & x_4 & -x_3 \\ x_3 & x_4 & -x_1^* & -x_2^* \\ x_4^* & -x_3^* & -x_2 & x_1 \end{bmatrix} \begin{bmatrix} x_1 & x_2 & x_3^* & -x_4^* \\ x_2^* & -x_1^* & x_4 & x_3 \\ x_3 & x_4 & -x_1^* & x_2^* \\ x_4^* & -x_3^* & -x_2 & -x_1 \end{bmatrix} \begin{bmatrix} x_1 & x_2 & x_3^* & -x_4^* \\ x_2^* & -x_1^* & -x_4 & -x_3 \\ x_3 & x_4 & -x_1^* & x_2 \\ x_4^* & -x_3^* & x_2 & x_1 \end{bmatrix}$$

$$\begin{bmatrix} x_1 & x_2 & x_3^* & x_4^* \\ x_2^* & -x_1^* & -x_4 & x_3 \\ x_3 & x_4 & -x_1^* & -x_2^* \\ x_4^* & -x_3^* & x_2 & -x_1 \end{bmatrix} \begin{bmatrix} x_1 & x_2 & -x_3^* & -x_4^* \\ x_2^* & -x_1^* & x_4 & -x_3 \\ x_3 & x_4 & x_1^* & x_2^* \\ x_4^* & -x_3^* & -x_2 & x_1 \end{bmatrix} \begin{bmatrix} x_1 & x_2 & -x_3^* & x_4^* \\ x_2^* & -x_1^* & x_4 & x_3 \\ x_3 & x_4 & x_1^* & -x_2^* \\ x_4^* & -x_3^* & -x_2 & -x_1 \end{bmatrix}$$

$$\begin{bmatrix} x_1 & x_2 & -x_3^* & -x_4^* \\ x_2^* & -x_1^* & -x_4 & x_3 \\ x_3 & x_4 & x_1^* & x_2^* \\ x_4^* & -x_3^* & x_2 & -x_1 \end{bmatrix} \begin{bmatrix} x_1 & x_2 & -x_3^* & x_4^* \\ x_2^* & -x_1^* & -x_4 & -x_3 \\ x_3 & x_4 & x_1^* & -x_2^* \\ x_4^* & -x_3^* & x_2 & x_1 \end{bmatrix}$$

where $x_1$, $x_2$, $x_3$ and $x_4$ denote four phase-rotated symbols.

18. The method as set forth in claim 12, wherein the generated new four by four matrix is given by:

$$\begin{bmatrix} e^{j\theta_1}s_1 & e^{j\theta_2}s_2 & e^{-j\theta_3}s_3^* & e^{-j\theta_4}s_4^* \\ e^{-j\theta_2}s_2^* & -e^{-j\theta_1}s_1^* & e^{j\theta_4}s_4 & -e^{j\theta_3}s_3 \\ e^{j\theta_3}s_3 & e^{j\theta_4}s_4 & -e^{-j\theta_1}s_1^* & -e^{-j\theta_2}s_2^* \\ e^{-j\theta_4}s_4^* & -e^{-j\theta_3}s_3^* & -e^{j\theta_2}s_2 & e^{j\theta_1}s_1 \end{bmatrix}$$

where $s_1$, $s_2$, $s_3$ and $s_4$ denote the input symbols, and $\theta_1$ and $\theta_4$ denote phase values for phase-rotating the symbols $s_1$, $s_2$, $s_3$, and $s_4$, respectively.

19. A method for receiving complex symbols in a wireless communication system, the method comprising the steps of:

receiving signals transmitted from four transmitting antennas to at least one receiving antenna during four time intervals;

estimating four channel gains of channels from the four transmitting antennas to the at least one receiving antenna;

producing metric values associated with all possible symbol sub-combinations using the channel gains and the received signals, and detecting two symbols having a minimum metric value among all the possible symbol sub-combinations, each of the symbol sub-combinations containing all possible two symbols; and sequentially arranging and outputting the two detected symbols.

20. The method as set forth in claim 19, wherein the detecting step comprises:

generating all the possible symbol sub-combinations;

rotating a phase of one symbol from the two symbols of the each symbol sub-combination by a predetermined phase value;

producing the metric values for the symbol sub-combinations containing the phase-rotated symbol using the received signals and the channel gains; and detecting the two symbols as the two symbols having a minimum metric value using the produced metric values.

21. The method as set forth in claim 19, wherein the detecting step detects two symbols $s_1$ and $s_3$ capable of minimizing the metric value of $|R_1-e^{j\theta_1}s_1|^2+|R_3-s_3|^2+R_{13}-e^{-j\theta_1}s^*_1 s_3|^2-|s_1|^2|s_3|^2$ in which $R_1$, $R_3$ and $R_{13}$ are given by:

$$R_1 = \left(\frac{r_1 h_1^* + r_2^* h_2 + r_3^* h_3 - r_4 h_4^*}{K}\right),$$

$$R_3 = \left(\frac{r_1 h_4^* + r_2^* h_3 - r_3^* h_2 + r_4 h_1^*}{K}\right) \text{ and } R_{13} = \left(\frac{-h_1 h_4^* + h_1^* h_4 - h_2^* h_3 + h_2 h_3^*}{K}\right)$$

and $K=|h_1|^2+|h_2|^2+|h_3|^2+|h_4|^2$ where $r_1, r_2, r_3$ and $r_4$ denote the signals recieved during the four time intervals, and $h_1, h_2, h_3$ and $h_4$ denote the channel gains of four antennas.

22. The receiver as set forth in claim 19, wherein the detecting step detects two symbols $s_2$ and $s_4$ capable of minimizing the metric value of $|R^2-s_2|^2+|R_4-e^{j\Theta_4}s_4|^2+|R_{24}-s^*_2 e^{j\Theta_4}s_4|^2-|s_2|^2|s_4|^2$ in which $R_2$, $R_4$, and $R_{24}$ are given by:

$$R_2 = \left(\frac{r_1 h_2^* - r_2^* h_1 + r_3^* h_4 - r_4 h_3^*}{K}\right),$$

$$R_4 = \left(\frac{r_1 h_3^* - r_2^* h_4 - r_3^* h_1 + r_4 h_2^*}{K}\right) \text{ and } R_{24} = \left(\frac{-h_2 h_3^* - h_1^* h_4 + h_4^* h_1 + h_3 h_2^*}{K}\right)$$

and $K=|h_1|^2+|h_2|^2+|h_3|^2+|h_4|^2$ where $r_1, r_2, r_3$ and $r_4$ denote the signals recieved during the four time intervals, and $h_1, h_2, h_3$ and $h_4$ denote the channel gains of four antennas.

\* \* \* \* \*